May 12, 1970     L. R. LEINING     3,511,410
CONTROL DEVICE FOR USE WITH A DISPENSING MACHINE
Filed Aug. 28, 1968
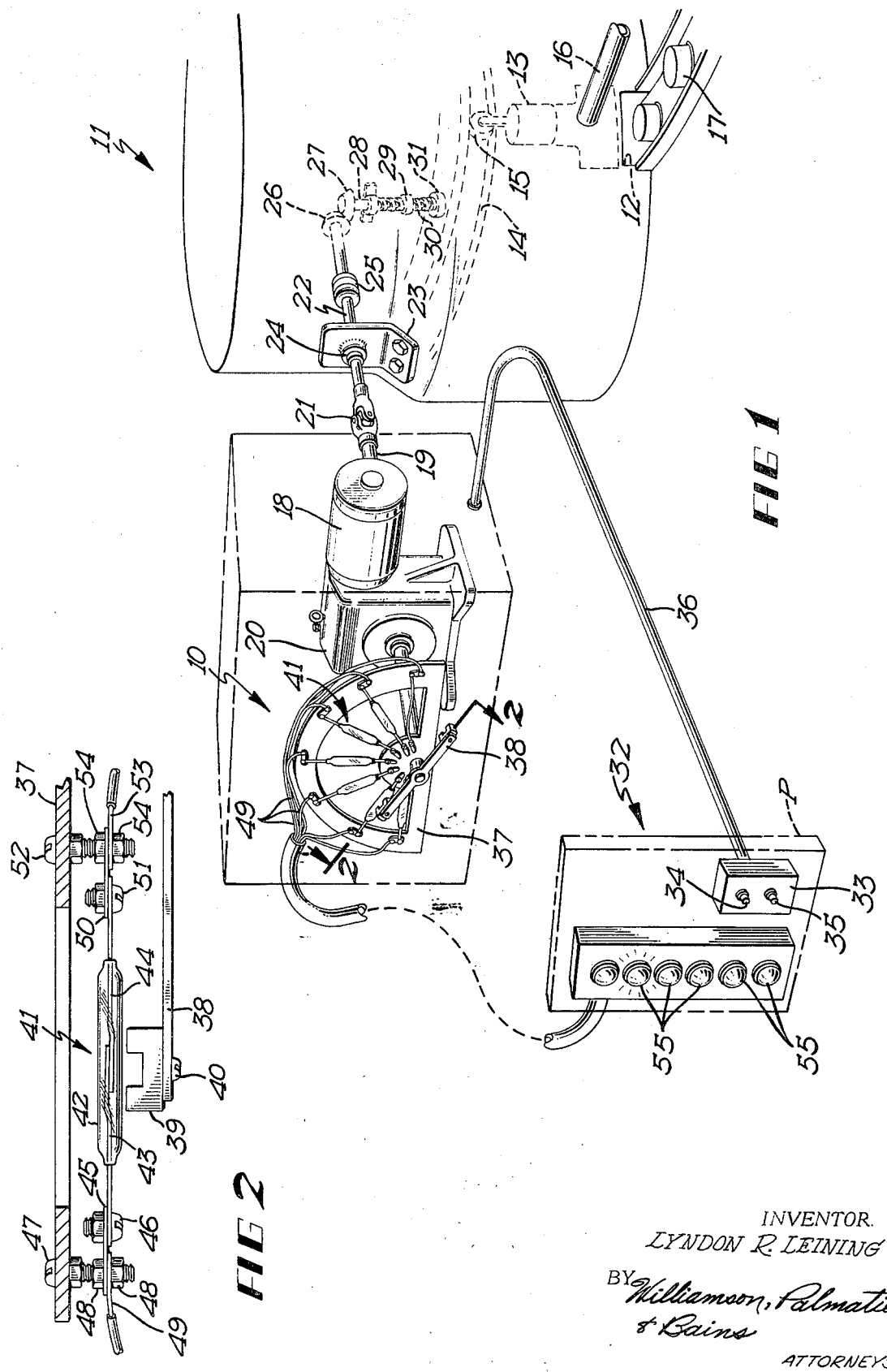
INVENTOR.
LYNDON R. LEINING
BY Williamson, Palmatier
& Bains
ATTORNEYS United States Patent Office 3,511,410
Patented May 12, 1970

3,511,410
CONTROL DEVICE FOR USE WITH A
DISPENSING MACHINE
Lyndon R. Leining, Mapleview, Minn., assignor to Geo. A. Hormel & Company, Austin, Minn., a corporation of Delaware
Filed Aug. 28, 1968, Ser. No. 755,866
Int. Cl. B67d 5/22; G08b 21/00
U.S. Cl. 222—45                           5 Claims

ABSTRACT OF THE DISCLOSURE

A control device for adjusting the quality of flowable material dispensed from a dispensing machine during operation thereof. The dispensing machine, including a revolvable multi-cavity unit having a plurality of plungers revolvable with the multi-cavity unit, each plunger being vertical shiftable in a cavity to dispense the flowable food product therefrom. An adjustable shaft connected in driven relation with a reversible electric motor and connected with the stroke adjusting means of the dispensing machine to permit adjustment of the stroke of the plungers. A plurality of indicator switches controlled by revolving movement of the adjustment shaft and being connected with indicator lights located remotely from the machine. A control switch positioned adjacent the indicator lights for controlling operation of the reversible electric motor.

SUMMARY OF INVENTION

There are many kinds of dispensing machines used for dispensing flowable food products into containers and the like, especially in the canning industry. Adjustment of these machines to control the quantity of the material being dispensed usually requires an operator to make a manual adjustment (usually by means of a manual adjustment screw) on the machine. Often container weights cannot be accurately checked near the manual adjustment without causing some interruption of production; that is, we could not get the ten can sample "pulled," weighed and placed back in the production flow without losing some production at the filler, but we can very easily secure, weigh and return sample to production at the end of the line with no lost production. The product flows onto a collection table prior to being loaded into retort baskets at the end of the line. It, therefore, seemed desirable to adjust the filler from the location at which an adequate sample cold be easily taken.

An object of this invention is to provide a control device for a dispensing machine which permits ready adjustment during operation of the machine of the dispensing plunger through a wide range of adjustments to selectively vary the quantity of material being dispensed from the machine. The control device permits an operator to readily adjust the dispensing machine at a point remote from the machine, and with suitable indicator means, such as indicator lights being provided at the remote station so that the operator will be constantly apprised of each increment of adjustment of the machine.

BRIEF DESCRIPTION OF THE FIGURES OF THE DRAWING

FIG. 1 is a diagrammatic view of the control device illustrated in controlling relation with the dispensing machine, and FIG. 2 is a cross-sectional view taken approximately on Line 2—2 of FIG. 1 and looking in the direction of the arrows.

DETAILED DESCRIPTION OF THE INVENTION

Referring now to the drawings, and more specifically to FIG. 1, it will be seen that one embodiment of the novel control device, designated generally by the reference numeral 10 is there shown. This control device 10 is for use in conjunction with a dispensing machine such as a dispensing machine 11 diagrammatically illustrated in the drawing. The dispensing machine 11 is of the type used in the meat packing industry for dispensing flowable food products such as meat into cans and includes a revolvable multi-cavity unit having a plurality of vertically oriented cavities therein, each cavity 12 accommodating one of a plurality of similar vertical plungers 13 therein. The plungers are vertically movable in the cavities and their vertical movement is controlled by an annular cam track 14 in which a cam roller 15 moves, the roller being connected to a plunger 13. The plungers 13 dispense the flowable food product from their associated cavities during the downward movement in their associated cavity. The food product is introduced into each cavity during the upward movement of each plunger.

Food is supplied to the machine and to each cavity through a supply conduit 16 while the containers such as cans 17 are moved by suitable conveyor means successively into position below the machine so that food dispensed from each cavity will be received into each container. Thus the machine heretofore described does not constitute, per se, the present invention and may be of the type used in dispensing such food products as deviled ham and the like, and this type of machine is well known in the trade.

The cam track 14 being of annular construction is disposed in oblique relation so that each plunger is moved downwardly during the dispensing cycle in its associated cavity and is shifted upwardly during the cavity filling cycle. By adjusting the angular disposition of the cam track, the quantity of food which may be introduced into each cavity may be controlled. The control device 10 permits adjustment of the cam track to control the quantity of material which is dispensed from the machine and this adjustment may be accomplished during operation of the machine. To this end, it will be noted that the control device includes a reversible electric motor 18 which is provided with a suitable output shaft not shown, which is connected to a driven adjustment shaft 19 through a gear reduction unit 20. The gear reduction unit 20 is comprised of a housing in which a gear train of the desired construction and design is disposed.

The driven shaft 19 is connected by a universal coupling unit 21 to one end of an elongate shaft 22, the latter extending into the housing of the dispensing machine 11. In this regard, the housing of the dispensing machine 11 has a bracket 23 mounted on the exterior thereof and this bracket accommodates a suitable bearing 24 which journals the shaft 22 therein. The shaft 22 is actually comprised of two shaft sections which are interconnected by a friction clutch 25 and this arrangement will minimize any damage to the filling machine if the adjustment motor should for any reason continue to run in either direction beyond the limit of the filler adjustment screw travel.

The shaft 22 has a bevel or angle gear 26 affixed to its inner end and this bevel gear is disposed in meshing relation with a bevel or angle gear 27. Bevel gear 27 is in turn secured to the upper end of a vertical shaft 28 and is journaled in a suitable bearing 29 which is disposed above the cam track 14. The lower end portion of the shaft 28 is threaded as at 30 and this threaded end portion threadedly engages a nut 31 secured to the cam track 14. It will be noted that the nut 31 is vertically oriented so that revolving movement of the shaft 28 causes raising or lowering of the associated side of the cam track.

Although not shown in the drawing, the cam track 14 will be supported within the dispensing machine for swinging movement about a substantially horizontal transverse axis. This cam track as pointed out above is in a tilted or oblique position and revolving movement of the shaft 28 increases or lessens the angle with respect to the horizontal. By raising the downwardly tilted side of the cam track 14, the amount of travel of each plunger in an upward direction will be increased, thus increasing the amount of material which may be introduced into each cavity to fill the same. Thus raising the tilted arcuate portion of the cam track, one may increase the amount of flowable food products dispensed from the machine. The converse is true also and when the tilted arcuate portion of the track is urged downwardly, the amount of material dispensed from the machine will be decreased.

Operation of the electric motor is controlled by an electrical control switch mechanism 32 which is comprised of two normally open separate switches each having a control button which extends exteriorly of the switch housing 33. One control button is designated by the reference numeral 34 and when depressed will drive the motor 18 in a forward direction while the control button 35 controls operation of the motor in a reversed direction. The switch mechanism 32 is mounted on a panel P remotely situated with respect to the machine 18 and the switch mechanism is connected by suitable electrical conductors 36 to the electric motor 18.

It is essential that an operator be apprised of the increment of adjustment of the machine since the adjustment is done at a point located remotely from the dispensing machine 11. This is especially true, since the amount of material dispensed from the machine may involve an amount of only a few ounces and any adjustment to vary the quantity of material to be dispensed will involve only a fraction of an ounce. Therefore, means are provided to appraise an operator of the increment of adjustment of the machine at the remotely located adjustment station.

To this end, it will be seen that the shaft 19 also extends from the opposite side of the gear reduction unit 20 and projects through a switch mounting segment 37. An elongate actuator arm 38 is affixed to the end of the shaft 19 and natural magnets 39 are secured to the ends of the arm 38 by suitable bolts 40.

The switch mounting segment 37 has a plurality of reed switches 41 mounted thereon and symmetrically arranged in 30° increments. It is pointed out that in the embodiment shown, the adjustment shaft 19 is indefinitely revolvable in either direction.

Since arm 38 has two natural magnets 39 affixed to it, there are no less than twelve fill change indications per revolution in the configuration shown.

Each reed switch 41 includes a housing 42 formed of a a non-metallic material, preferably glass or plastic, and enclosing the switch contacts 43 and 44 therein in sealed relation from the exterior. In the embodiment shown, the switch contact 43 is formed of a magnetic material and the switch contacts are normally urged into the open condition.

The switch contact 43 extends outward from the associated switch housing 42 and is secured to a small connector plate 45 by nut and bolt assembly 46. The connector plate 44 is mounted on the switch mounting segment 37 by nut and bolt assembly 47 and suitable nuts 48 connect the connector plate 45 in contacting relation to an electrical conductor 49. It is pointed out that the switch mounting segment 37 is preferably formed of a suitable non-conductive material.

Each switch contact 44 extends outwardly from its associated housing 42 and is connected to a connector plate 50 by means of a nut and bolt assembly 51. The connector plate 50 is also connected to the switch mounting segment 37 by a nut and bolt assembly 52 and is connected to a conductor 53 by suitable nuts 54.

The panel P is provided with a bank or plurality of indicator lights 55 which are arranged in a vertical row or bank. This was done so that as the operator adjusted more fill per can, he could associate an increase with the lighting of an indicator light at a higher location in the row. Therefore, an increase adjustment is visually manifested to an operator as the lights successively blink on and off from bottom to the top of the bank. Conversely, a decrease adjustment of the fill is manifested visually to an operator by the indicator lights successively blinking on and off from top to the bottom of the bank of lights.

One contact of each light is connected to one of the electrical conductors 49 while the other contact of each light is connected to one of the electrical conductors 53. These circuits as well as the circuit to the electric motor 18 will be connected to a source of suitable electric current. It will be seen that when any of the reed switches is closed, its associated indicator light will also be illuminated.

In use, the cam track for the dispensing machine will be preset at a desired position so that a predetermined amount of material will be dispensed from the dispensing machine into the containers 17 which are to be filled. If it is found that an insufficient amount of flowable food material is being dispensed from the machine, an operator may then depress a button 34 which energizes the electric motor 18 and which revolves the adjustment shaft 19 in a direction to increase the amount of material being dispensed. The actuator arm 38 also moves with the shaft 19 and if the increased direction is in a counterclockwise direction for the actuator arm 38 as viewed in FIG. 1, then the arm will be moved causing the magnet 39 to be shifted from proximal relation with respect to one reed switch to the next adjacent reed switch. As the magnet moves away from one switch, the switch contacts, which will have been in closed condition, will be opened. This occurs since the switch contact 43 of each reed switch is moved into contacting relation with the switch contact 44 because of its magnetic attraction to the magnet 39.

As the magnet approaches the next adjacent reed switch, the contacts will be closed, thus energizing the circuit to the next adjacent light. As each light is illuminated, the operator will be readily apprised of each increased increment of adjustment or each decreased increment of adjustment. Thus an operator may readily adjust the quantity of material being dispensed from the filling machine at a station located remotely from the machine and will be instantly apprised of each increment of adjustment.

In the embodiment shown, each increment of adjustment comprises approximately ⅟₆₄ of an ounce so that extremely accurate adjustments may be accomplished. It is pointed out that the switches of the control switch mechanism 32 may be the impulse type wherein depression of either push button 34 or push button 35 energizes the motor only to move the adjustment shaft 19 through one increment of movement. This requires the switch to be depressed and released in order for each successive increment of movement to be accomplished. However, other kinds of control switches may be utilized which permit the circuit to the electric motor to be deenergized only upon release of the control button.

As many increments of adjustment as necessary are possible in either direction with respect to the embodiment shown. In this regard, it is also pointed out that the adjustment shaft 19 may be moved angularly through an arc of 360° in either direction for as many revolutions as required. The size of weight increment of product is contingent upon the spacing of the reed switches. For example, if it is desirable to reduce the weight increment to one-half the weight increment as described, it would be necessary to provide reed switches every 15° rather than every 30°.

From the foregoing description, it will be seen that I have provided a novel control device for use with dispensing machines so that the quantity of flowable food product dispensed from the machine may be readily controlled by an operator at a remote station. This adjustment of the material dispensing machine may be accomplished even though the dispensing machine is operating, thus obviating the need to shut the machine down to accomplish such adjustment. The present control device permits the dispensing machine to be effectively and accurately controlled by thus increasing the efficiency of the dispensing function of the machine.

It will further be noted that by using switches which are sealed from the exterior and which are operated in response to magnetic attraction, the switches may be maintained in a clean operative condition even though most of the apparatus is constantly subjected to the action of water and steam during cleaning operations.

Thus it will be seen that I have provided a novel control device for use with dispensing machines which is not only of simple and inexpensive construction but one which functions in a more efficient manner than any heretofore known comparable device.

It will, of course, be understood that various changes may be made in the form, details, arrangement and proportions of the various parts without departing from the scope of my invention.

What I claim is:

1. A control device for adjusting the quantity of flowable food products dispensed from a dispensing machine including a revolvable multi-cavity unit having a plurality of cavities therein, a plurality of plungers vertically shiftable in the cavities and revolvable with the revolvable unit, means for controlling the vertical stroke of the plungers, a reversible motor, a driven adjustment shaft interconnected with said motor and the stroke controlling means of a dispensing machine, said driven shaft when revolved in one direction increasing the magnitude of the stroke of each plunger to increase the material dispensed from the associated cavity and when revolved in the opposite direction decreasing the magnitude of the stroke of each plunger to decrease the amount of material dispensed from the machine, a control mechanism connected in controlling relation with respect to said motor and being remotely disposed with respect to the dispensing machine, a plurality of symmetrically arranged electrical incandecent indicator lights positioned adjacent said control mechanism and remotely from the dispensing machine, a plurality of similar normally open switches adjacent said shaft and disposed in symmetrical arrangement with respect to each other, electrical conductors connected to a source of electrical current interconnecting one of said switches in circuit controlling relation with one of said indicator lights, whereby when one of said switches is closed, one of said lights will be illuminated, and an actuator arm on said adjustment shaft and being operable when moved through its extent of travel in either direction to successively close each switch as it is moved in close proximal relation with respect to each switch, each switch returning to its normally open condition as the actuator arm is moved from proximal relation with respect thereto.

2. The control device as defined in claim 1 wherein said reversible motor is an electric motor and said control mechanism comprises an electrical control switch.

3. The control device as defined in claim 1 wherein said similar switches each include a switch housing formed of non-magnetic material, a pair of switch contacts positioned within each housing and sealed from the exterior, one of said contacts being formed of a magnetic material, said actuator arm having a magnet secured thereto for causing each of said switches to be shifted to the closed condition when moved in close proximity thereto.

4. The control device as defined in claim 3 wherein said similar switches are arranged in an arcuate pattern, and said adjustment shaft is revolvable through an arc of at least 360° in either direction.

5. The control device as defined in claim 2 and a gear reduction unit interconnected with said driven shaft and with said reversible motor, a second shaft connected with said driven shaft and a friction clutch interposed between said second shaft and the stroke controlling means of the dispensing machine.

References Cited

UNITED STATES PATENTS

| 2,550,318 | 4/1951 | Worthington | 340—271 |
| 3,252,619 | 5/1966 | Miller | 222—52 X |

ROBERT B. REEVES, Primary Examiner

H. S. LANE, Assistant Examiner

U.S. Cl. X.R.

222—309; 340—188, 271